United States Patent
Herberger et al.

(10) Patent No.: US 8,464,154 B2
(45) Date of Patent: Jun. 11, 2013

(54) SYSTEM AND METHOD FOR SYNCHRONIZED MULTI-TRACK EDITING

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 548 days.

(21) Appl. No.: 12/713,006

(22) Filed: Feb. 25, 2010

(65) Prior Publication Data

US 2010/0218097 A1    Aug. 26, 2010

Related U.S. Application Data

(60) Provisional application No. 61/155,374, filed on Feb. 25, 2009.

(51) Int. Cl.
*G06F 3/00*    (2006.01)

(52) U.S. Cl.
USPC .......................................... 715/725

(58) Field of Classification Search
USPC .......................... 715/723, 725, 727
See application file for complete search history.

(56) References Cited

U.S. PATENT DOCUMENTS

| | | |
|---|---|---|
| 3,170,118 A | 2/1965 | Logan |
| 5,557,423 A | 9/1996 | Phillips et al. |
| 5,619,733 A | 4/1997 | Noe et al. |
| 5,745,637 A | 4/1998 | Phillips et al. |
| 5,832,309 A | 11/1998 | Noe et al. |
| 6,262,777 B1 | 7/2001 | Brewer et al. |
| 6,728,584 B1 | 4/2004 | Dunn et al. |
| 6,917,566 B2 | 7/2005 | Griner et al. |
| 7,046,694 B2 | 5/2006 | Kumar |
| 2007/0035612 A1 | 2/2007 | Korneluk et al. |
| 2007/0129952 A1 | 6/2007 | Kenyon et al. |
| 2007/0201815 A1 | 8/2007 | Griffin |
| 2008/0044155 A1 | 2/2008 | Kuspa |
| 2010/0183280 A1* | 7/2010 | Beauregard et al. ............ 386/54 |

* cited by examiner

*Primary Examiner* — Thanh Vu

(74) *Attorney, Agent, or Firm* — Fellers, Snider, Blankenship, Bailey & Tippens, P.C.; Terry L. Watt

(57) ABSTRACT

There is provided herein a system and method for producing a single audio recording from multiple recordings of the same event. In the preferred embodiment, the instant invention will automatically analyze and visually time-align each of the individual source takes, so that the takes containing the same content are positioned beneath each other. This will make it possible for the user to quickly survey, evaluate, and edit different takes of the same event. The instant invention will automatically keep track of the source material presented in by the visual display and will transfer content selected by the sound engineer from a source to a destination location to create the single audio recording.

11 Claims, 5 Drawing Sheets

SYSTEM AND METHOD FOR SYNCHRONIZED MULTI-TRACK EDITING

This application claims the benefit of U.S. Provisional Patent Application Ser. No. 61/155,374 filed on Feb. 25, 2009 and incorporates said provisional application by reference into this document as if fully set out at this point.

FIELD OF THE INVENTION

The present invention relates generally to the field of audio editing and, more particularly, to methods for editing multiple performances of the same work into a single multimedia work.

BACKGROUND OF THE INVENTION

For the past few years the processes associated with professional recording and editing of multiple takes of classical or other music have been generally the same. In the case of classical recording, the orchestra, the conductor and a professional sound engineer tasked with recording the orchestra typically meet in a location with acoustic properties suitable for recording such an audio work. Each individual/instrument of the orchestra is supplied with a microphone. Normally each microphone records the associated individual/instrument into a separate recording track. During the recording phase, the sound engineer, conductor and orchestra work together to record the work in the best way possible. Typically, musical passages may be played and recorded repeatedly in an effort to capture the best possible recording. Of course, some takes will be better than others, as will some individual recordings. Some recordings may even occasionally contain dialogue between the participants.

At the end of such a recording session, the sound engineer will usually have accumulated recorded content from the numerous individual recordings that is at least two or three times the length of the actual work.

In other instances, a sound engineer may be presented with several complete recordings of the same musical work (e.g., an opera that is recorded on three consecutive days) and be asked to create a composite audio work containing the best portions of each day's recording.

Usually the sound engineer opens the recordings in a stand-alone digital audio workstation, or a host-based digital audio workstation. The audio data is then presented to the user in a graphical user interface with the recording from each microphone being placed in its own track. Thus, there typically will be as many tracks as there are microphones. The recording itself is typically presented at full length in the graphical user interface.

The creation of the final music work out of such a recording is usually a hard and long process. A professional sound engineer typically will spend at least 3 hours doing post processing for each hour of source material. A consideration of the steps involved may make the reason for this clearer.

First, the sound engineer must become familiar with all of the recordings. He or she will listen to each take and compare them with each other to determine which take contains the best quality recording. Second, the take that is determined to be the best is then extracted and copied to the final recording. It may require more than 1000 such "select and extract" operations when, for example, a symphony is being edited. Associated with each select and cut operation is usually a lengthy process of searching through the recorded material, track-by-track, to find the best recording. Moving forward and backward through the different takes, listening to each take and mentally comparing them again and again is a required step in the assembly process. Since the raw material will be three or four times the length of the performance, it should be clear that the process of forming a single recording is difficult and labor intense.

Thus, what is needed is a system and method that assists the user in editing digital audio recordings that have a number of different tracks and takes where a "track" will be understood to represent a recording from a single microphone and a "take" understood to be a collection of multiple microphones that all record the same performance. It would be preferred that such a system and method would provide the user with an increase in efficiency and a corresponding reduction in the time required to edit such a complex digital audio recording.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for providing a user with a simplified visual display of one or multiple recordings of the same audio event and allowing the user to use that display to produce a single audio recording from the multiple recordings. Note that the different recordings may or may not be continuous (e.g., some of the recordings may be intermittent).

The instant invention will preferably allow a user to read and edit source material that contains multiple recordings of one performance on a digital audio workstation. It should be noted that the process of the instant invention is not directed to automating the editing process or the processes connected with editing such recordings. It is intended to help the user visualize the multiple individual recordings, where "visualize" is to be understood as providing the user a visual overview of these multiple recordings by positioning musically similar sections beneath each other. This arrangement is preferred because it will allow the user to quickly compare the individual recording takes, furthermore it allows the user to edit the content visually. Additionally, the instant invention will allow the user to select, cut and copy directly within the visual overview. The instant invention will allow the user to insert portions of the multiple recordings into a destination project. It should be noted that the term "take" as it is used herein should be broadly interpreted to be a continuous recording of a version or performance of a musical work, to include the recording of only a portion of that work. In the event that a musical passage has been recorded more than once, the instant invention will preferably assist the user in creating separate takes from the input as is described below.

In the preferred embodiment, the sound engineer or other user will work within the framework of a source/destination concept, i.e., that there is a source project and a destination project. This concept represents the philosophy that the project into which the processed audio material is to be placed will be different from the project into which the source material is placed. Note that the term "project" is used to describe the sections into which the input and output material are inserted by the instant invention. Additionally, note that although the user of the instant invention may be a sound engineer, that is not required at all. Thus, in the specification that follows the terms "user" and "sound engineer" will be used interchangeably.

Associated with the source/destination concept is the use of so called "markers." The markers are on-screen visual representations of the instructions of the sound engineer. The markers define which sections from the source material are to be selected. The sound engineer or other user can define "in" and "out" markers in both source and destination project and the instant invention will select and process the sections generated by those markers.

The instant invention preferably utilizes an overview project that functions as the main work area of the sound engineer. To be more specific, the overview project will preferably be added to the graphical user interface that already contains and displays the source project and the destination project. The instant invention will then preferably insert the takes from the source project into the overview project and time-align them with a reference track which will preferably have been previously selected by the sound engineer. The different takes will then preferably be added to the overview window and aligned with the reference track via a pattern detection algorithm which will analyze the material contained in the reference track and which looks for similar musical patterns in the take(s).

The reference track will preferably be a track that contains a recording that was taken from, for example, one of the master microphones, which preferably will contain a recording of the entire orchestra (or band, etc.). Further, and preferably, it will contain a continuous recording of an entire performance of the musical work but, as discussed below, that is not essential.

Another preferred functionality of the overview project window is to correct for timing differences (e.g., in beats per minute/tempo) which might persist the entire length of the take or last only for a few measures (e.g., if the tempo is not constant). In this instance, the user will preferably be given the option as to whether or not to calculate such a beat correction (and whether to limit the tempo adjustment to a time interval or to adjust the entire track). Methods of adjusting the tempo of an audio work are well known to those of ordinary skill in the art. Note that in the preferred arrangement, only the visual display will be adjusted—the playback speed of the source material will preferably remain unchanged. The display of a take will preferably be altered by compressing and stretching the graphical representation of the audio material to reflect the tempo adjustment.

The system and method taught herein will therefore preferably be designed to allow the user to simultaneously view all of the performance takes at one time.

In one preferred embodiment, by selecting different active tracks in the overview project it will be possible to quickly change the audio output to a different take during playback. This allows the sound engineer to quickly perform an A/B check of different takes. Additionally, the instant invention will preferably provide the sound engineer with complete control of the source project, even though most of the activities take place within the overview project. If the playback position/cursor position is changed in the overview project, the cursor position will preferably automatically jump to the new position in the source project. Both the overview project and the source project will preferably be automatically linked together and actions implemented by the sound engineer in the overview project will preferably be automatically reflected in the source project.

When the sound engineer defines an area within the overview project or places a source-in and a source-out marker into a track in the overview project, the instant invention will preferably automatically mirror these activities in the source project. This feature helps the sound engineer avoid long searches within the source material for the correct position of a cut. If the user initiates a cut operation, the selected (as defined by the area, or the section between source-in and source-out marker) source material will preferably be copied from the source project into the destination project.

In one preferred embodiment the cut operation will be supplemented by a cut algorithm, the purpose of which will be to ensure that the takes in the destination project that are to be mixed together or otherwise combined are in phase. That is, the takes will be shifted in such a way, that there will be no or little extinction between takes. This will tend to make cuts less noticeable to the listener.

In another preferred embodiment there will be provided an enhanced connectivity between the destination project and both the source and the overview project. If a cursor position is changed in the destination project, the cursor position in both the source and overview projects will also preferably be automatically changed. Additionally, in another preferred variation, selecting a take in the destination project will automatically mark the corresponding section in the overview project. The sound engineer will also preferably be able to manually modify the automatic linking between the different takes in overview, source and destination project—in such a case it will preferably be possible to repeat the automatic synchronization. With such functionality, it will be possible to copy objects from other musically similar bars and keep these objects synchronized.

According to a preferred embodiment, the instant invention preferably begins with the activation of the digital audio workstation, and software that is desired to implement the functions of the instant invention. This software will preferably be stored on a personal computer that has access to the digital audio recordings. The computer might be located in the recording studio or remotely.

In the preferred embodiment, the instant invention operates in two phases. The first phase is the preparation phase which assists the user in performing non-destructive editing on the input. The second phase is the implementation phase, which actually performs the cut and editing operations that have been chosen by the sound engineer.

In the preparation phase, the sound engineer will preferably identify the source project or possibly projects. The source projects will preferably be data structures or containers which contain links to the source audio material. The sound engineer might have created the source projects during a previous session, or they might be provided by another source. A source project might contain one recording, although it is also possible that a number of recordings might be linked to a single source project.

In a next preferred step, the instant invention will determine if a destination project has been previously created. The destination project will preferably be a data structure containing instructions and storage locations of digital audio material. The destination project will utilize data values that describe individual tracks, start, and end sections, timing values from the source project/projects, relative offset from the reference track, etc. Such an approach helps makes sure that the source material is left unmodified until the sound engineer is finished editing. This approach provides a great deal of flexibility to the sound engineer. If a destination project has been previously created, it will be opened after selection by a user. The instant invention will preferably automatically adjust and define the parameter settings that are utilized by the destination project if needed.

As a next preferred step, the instant invention will determine if the source audio material has been separated into individual takes. If not, the instant invention will preferably initiate a so-called "take assistant." This assistant is designed to help the sound engineer separate the audio material into takes by identifying quiet (or silent) passages in the audio. The user will then decide whether or not to cut the audio at the identified point in order to separate the audio recording into separate takes.

In the next preferred step the sound engineer will define the reference track by selecting it from among the tracks in the source project, although the selection of a reference track could be performed automatically by the instant invention at the time when the source project is created. Absent a selection from the user, the active track in the source project will preferably be selected by default to be the reference track. Furthermore the instant invention will preferably determine whether or not the reference track contains a continuous recording. If it does, the user will preferably be given the option of cutting the reference track to match other cuts in the project, e.g., cuts that have been selected in other tracks.

In the next step, the instant invention will preferably analyze the source material and identify, using the reference track as a starting point, similar musical passages from the multiple source materials or takes. The instant invention will then populate the graphical user interface of the overview project with the appropriate graphical objects which are associated with audio material in the different tracks, with different tracks preferably being separated vertically. Preferably, the instant invention will present the audio material in such a way that the user will be presented with a graphical display that contains time-aligned graphical objects representing the audio material. This allows the user to access and work with the audio material as if the timing differences are nonexistent.

The user, in a next preferred step, will then be able to edit the source audio material and compile an output track which will preferably be visually displayed in the destination project section of the graphical user interface. The sound engineer will define cut points in the overview project and, because of the link between destination project and overview project, those cuts will appear also in the destination project. However, preferably, the cut points will be identified at this point, but not actually be applied until the user directs that to happen.

After the sound engineer identifies a section of the source material, preferably by setting up source-in and source-out markers, the instant invention will preferably identify the same passage in the source project. If the sound engineer specifies a cut operation, the instant invention will initiate the cut in the corresponding track in the source project and will transfer the data that defines the cut to the destination project and create a graphical object that represents these data values. Additionally, the sound engineer will also preferably be able to alter the appearance of content in the overview project. However, preferably only changes that are designed to correct discrepancies introduced into the synchronization between source project and overview project will be permitted. Preferably the sound engineer will be able to release individual graphical objects representing audio material from synchronization to initiate a cut operation or to move the cut graphical object to its preferred position where the graphical object is then synched again.

It should be clear that an approach such as this would be a tremendous aid to the sound engineer who is working with multiple versions/takes of the same performance/musical work. Additionally, by automatically analyzing and creating a visual display dedicated to help the user more quickly and easily access and distinguish the multiple versions/takes of the same performance, the efficiency of an editor will be improved. Monotonous tasks will be automated and the editor will be allowed to focus on creativity rather than mechanics. The instant invention will assist the user initiating the plurality of editing instructions when working with multiple versions of one performance. The huge amount of data that is created when multiple takes are recorded with multiple mikes is displayed in such a way to make dealing with such much more manageable.

Furthermore, the system of the instant invention provides the user with a completely new approach of working with and editing such multi version performances. It allows the sound engineer to concentrate the work on the audio material, instead of spending time searching for a particular take. The instant invention is preferably applicable when working with multi version performances of classical music; however, it is certainly possible that embodiments might be applicable to other music genres as well, jazz, rock, pop, etc. The instant invention assists the sound engineer who is tasked with editing and processing multi version performance by analyzing the content of the takes and arranging the visual display of the content in such a way that similar music sections are synchronized with each other. This synchronization is used by the instant invention when implementing and executing user initiated editing instructions.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein.

Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
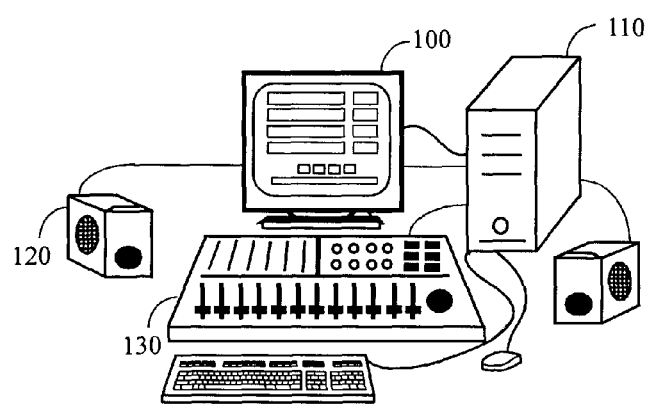
FIG. 1 depicts the general environment of the instant invention.

Referring now to the drawings, wherein the reference numerals indicate the same parts throughout the several views, there is provided a system and method for quickly and easily editing multiple audio recordings of the same event into a single recording that might be mono, stereo, surround sound, etc. The instant invention preferably utilizes a system and method for synchronized multi-track editing, wherein the multiple tracks are presented to the user visually in a graphical user interface specifically designed for that purpose. The instant invention will preferably enable the user to process and edit the multiple audio recordings of the same event from within this interface. The instant invention will preferably automatically process the source material and generate the multi-track graphical user interface containing the processed and analyzed source material. The user will be able to edit the content by utilizing the familiar source project—destination project concept. However, the instant invention extends this concept by introducing and adding an overview project into the graphical representation of the source project and destination project. The overview project will preferably be organized such that similar audio material is positioned on the screen aligned with each other. The instant invention will preferably allow a user to initiate editing processes within the overview project, wherein overview project, destination project, and source project are synchronized with each other such that an editing instruction initiated in the overview project will select an audio segment from the source project and automatically insert it into the destination project.

By way of general explanation and in accord with the preferred embodiment, the instant invention preferably utilizes an automated process that supplies the user with a graphical user interface containing interconnected and synchronized audio material, in the form of multiple tracks. The instant invention will preferably store audio material into the multiple tracks, which will be taken from multiple recordings of the same event in the tracks. Preferably, similar content will be positioned vertically beneath each other on the screen and the sequential content will be positioned horizontally. The instant invention will also preferably automatically adapt the visual display of the content in the graphical user interface so that the user can visually determine the similar passages. Additionally, the instant invention will preferably provide the user with a work environment where the synchronized projects (destination, source and overview) are displayed in a specialized graphical user interface. The instant invention will preferably allow the user to edit the multiple recordings of one event from within one access point—the overview project.

The preferred embodiment of the instant invention utilizes a combination of analysis and editing operations. The steps associated with and supporting these operations are preferably initiated automatically by the instant invention. The user will preferably be provided with a graphical user interface that contains the prepared source material in an overview project. The prepared source material includes a visual display of the source material, where similar content (multiple recordings of the same event) will be arranged vertically to provide the user with an easily accessible overview of the content.

The analysis operations will preferably be performed without user interaction and preferably without user input. The analysis operations provide the data that is subsequently used in the generation of the visual display of the overview project. The workflows, additional specifications, and individual embodiments of the instant invention will be described in more detail below.

As is generally indicated in FIG. 1, at least a portion of the instant invention will be implemented in form of software running on a personal or other computer 110, the computer preferably being used as a digital audio workstation. Such a computer will have some amount of program memory and nonvolatile storage (e.g., magnetic disk, flash RAM, etc.), whether internal or accessed via a network, as is conventionally utilized by such units. Furthermore a display device 100 will preferably be attached to the computer 110 so that visual information can be provided to the user. Preferably, the display device will be a TFT-display (i.e., "thin film transistor" display), although that is not a requirement. Additionally it should be noted that it is common to use multiple display devices in order to provide the user with additional screen real estate which can be very useful when doing audio and other types of editing. As such, when the term "display device" is used herein, that term should be understood to mean one or more physical display devices.

Additionally, in the realm of professional or amateur audio editing it is common to have audio speakers 120 connected to the digital audio workstation 110, so that audio information can be auditioned and evaluated by the sound engineer. Preferably there will be at least two audio speakers 120 connected to the computer, although that is not a requirement. It is common in the professional audio editing environment to equip the editing studios with at least 5 speakers plus one sub woofer. Of course, in some instances headphones might be used along with or instead of the speakers 120. Additionally, it is anticipated that a keyboard and mouse might be useful. In the audio editing environment, a mixing console 130 might also be connected to the computer. This peripheral would permit the sound engineer to more efficiently access the individual functions and options of the digital audio workstation software installed on the computer 110.

Figure 2:
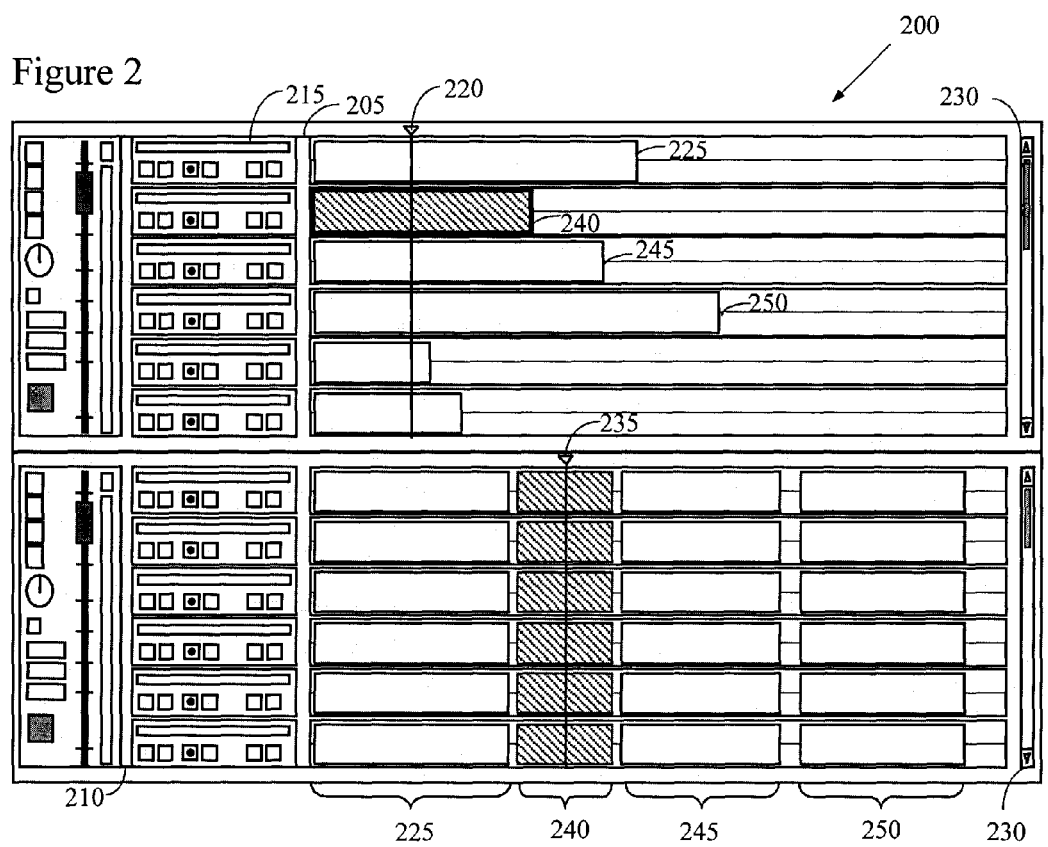
FIG. 2 illustrates a part of graphical interface of the instant invention according to a first embodiment.

Turning next to FIG. 2, this figure illustrates a preferred graphical user interface. As is indicated in this figure, the user will preferably be presented with a computer screen display 200 that provides access to the digital audio software. In this particular example the computer screen display 200 displays the overview project in section 205 of the computer screen display. The other section contains the source project 210. Note that both the overview project section 205 as well as the source project section 210 preferably provide a track based organization where individual tracks in the source project 210 will typically represent the different microphones that make up the recording of a take, with each microphone often being associated with a different individual instrument or instrument group. Note also that one or more microphones might be found within video recording devices (e.g., digital video cameras) that are there to record a video of the performances. In such instances, audio extracted from this sort of device will be usable according to the instant invention in the same way as recordings from dedicated microphones. Thus, in the text that follows, when the term microphone is used that term should be construed in its broadest sense to include any device capable of recording sound, whether that capability is its primary function or not.

In FIG. 2 four different takes have been selected for processing and are displayed in expanded form in the source section 210, i.e., take 1 (225), take 2 (240), take 3 (245) and take 4 (250). The expanded form of each take in the source section 240 will preferably reveal all of the different microphone recordings that comprise one of the takes in the overview project 205 window. In the case of the example recording of FIG. 2, six microphones have been utilized with each take (i.e., the six tracks of the source section 210). Of course, it is not essential that each take utilize the same number of microphones, as it is known to add or remove microphones between successive takes. Note also that the six takes in the overview project 205 window are illustrated as being of different lengths. Takes might be longer or shorter for any number of reasons including tempo differences between performances, recordings that only include only part of the work (e.g., where it desired to just repeat the bridge section), etc.

In the overview section 205 the tracks are different takes which have been organized according to their musical features. This makes it easy to identify similar content and perform editing functions from within this window. The track-specific setup options 215 allow the sound engineer to mute individual tracks, initiate the recording or playback of individual tracks, etc. Of course, the number of tracks in a project will be essentially unlimited and will usually correspond to the number of recordings/microphones obtained during the performance(s). The sound engineer will also preferably be able to navigate within the source project section 210 and the overview project section 205 by interacting with a scrollbar 230.

Returning to a discussion of the source 210 and overview 205 project sections, in this figure both sections have been filled with data. The source project section 210 contains the recorded audio materials separated into individual tracks, with each track representing the recorded data from one recording session. Additionally, the source project section 210 preferably presents the recordings to the sound engineer exactly the way they were recorded—visually and acoustically. The individual recordings in the source project section 210 comprise the recordings that make up the takes 225, 240, 245 and 250. In this figure, take 240 has been highlighted. Typically, the sound engineer will copy the source audio recording into/in the workstation 110 or access the recording remotely. In either case, the source project section 210 will automatically be filled with the content.

The instant invention will then preferably perform an analysis of the source recordings in preparation for adding content to the overview project section 205. The analysis will identify similar audio content in the different takes and will preferably arrange the takes in the overview project section 205 with each take or recording positioned beneath the other and display the content on the screen in such a way as to make it easy to see the similarities between the different takes or recordings.

The instant invention will also preferably provide a timeline indicator 220 in the overview project section 205 and the source project section 210. Although these indicators may not be the same, both will preferably be synchronized with each other. In FIG. 2, the user has selected track 2 take 240 and navigated within this take 240. The timeline indicator 220 illustrates this selection. Preferably, each operation performed in the overview project 205 will be reflected in the source project 210. Thus, the timeline indicator 235 in the source project section 210 has been moved to match the take selected in the overview project section 205 and placed at the same time position. Not illustrated in FIG. 2 is the destination project section that is also a part of the preferred graphical user interface. The destination project section will receive the selected audio content from the source project section 210 after editing instructions issued in the overview project section 205 have been performed.

Figure 3:
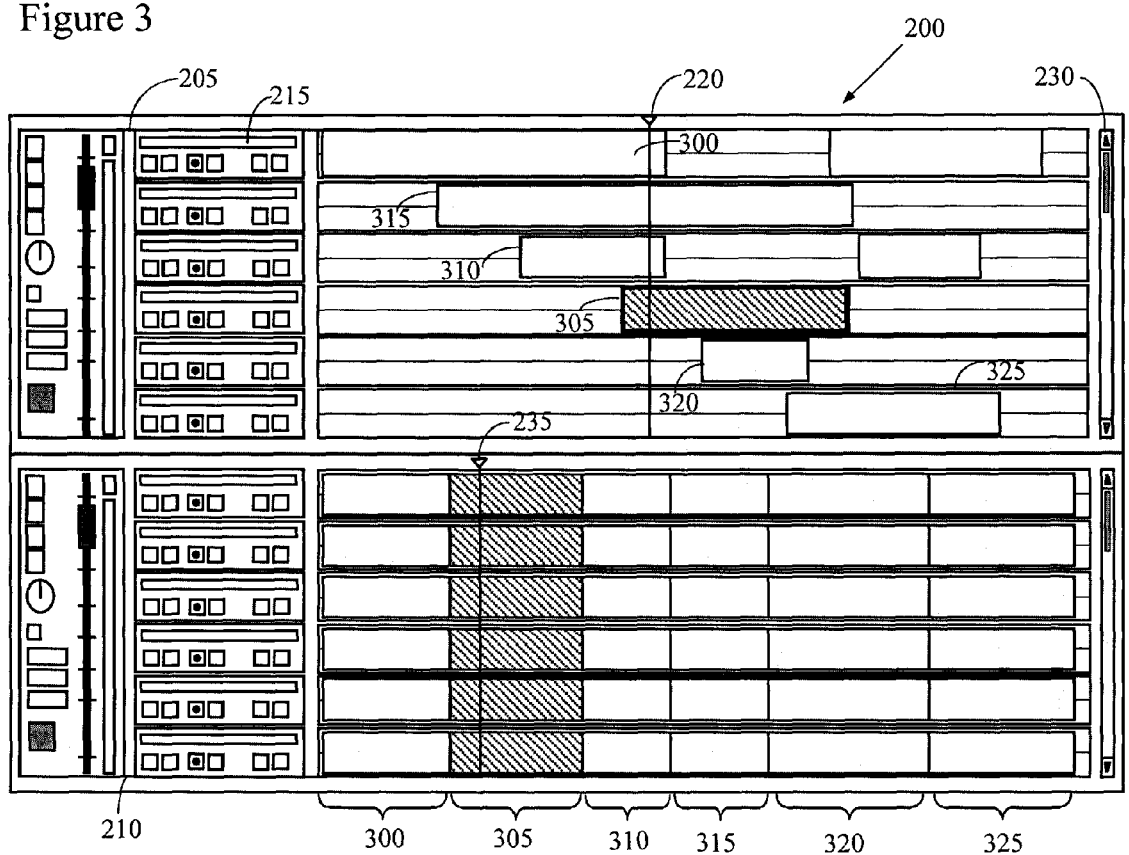
FIG. 3 illustrates a part of the graphical interface of the instant invention according to a second embodiment.

Turning next to FIG. 3, this figure illustrates a preferred graphical user interface as it might appear when editing a continuous source audio recording containing multiple recording takes. As is indicated in this figure, the user will preferably be presented with a computer screen display 200 that provides access to the functionality of the instant invention. In this particular example, the display 200 presents the overview project in one section 205 of the screen, while the source project 210 is displayed in another section. Note that both the overview project section 205 and the source project section 210 provide a track based arrangement, where the individual tracks in the source project 210 represent individual microphones, with each microphone potentially recording a separate instrument in some embodiments.

Similarly, the graphical user interface will preferably contain a section with track-specific setup options 215. These options might allow the user to mute individual tracks, to initiate the recording of individual tracks, or to perform any number of other functions. The number of tracks preferably corresponds to the number of recordings which might be arbitrarily large in number. The sound engineer will also preferably be able to navigate within the source project section 210 and the overview project section 205 by interacting with a scrollbar 230.

Because the source material, in this preferred embodiment, is a continuous audio recording that potentially contains multiple, perhaps repeated, takes of audio content, the editing approach that is preferred will be similar to that described previously in connection with FIG. 2. However, there are differences between the approach of FIGS. 2 and 3.

In the approach of FIG. 3, the sound engineer will preferably copy the source material to the audio workstation and the instant invention will add the graphical representations of the source material to the source project section 210. In connection with this step, the instant invention will preferably analyze the input audio material to detect similar audio content in the recordings and provide a visual presentation of the similarities to the sound engineer. The source project section 210 will preferably present the recordings to the editor as they were recorded—both visually and acoustically. This means that if there have been short breaks in the recording sessions that contain, for example, dialogue between the participants, this dialogue will also be part of the visual display. Similarly, if there were actual breaks in the recordings these will also be visible.

By using the results of a similarity analysis, the instant invention will preferably generate the individual takes 300, 305, 310, 315, 320 and, 325. Although the similarity might be calculated in many ways, correlation analysis (including cross correlation) and waveform matching are two preferred ways of doing this computation. A standard parameter that would be output from such an analysis would be a time lag value (e.g., a time offset) between the reference track and the other tracks. Additionally, in some cases the similarity calculation will be windowed, i.e., rather than using the entire track in the similarity calculation only a portion of each track will be used. This could be particularly useful in the event that one track only contains a portion of a performance. Those of ordinary skill in the art will recognize how such a parameters such as the time offset or lag could be used to time-align each of the tracks with the reference track. Note that when two different takes are examined to determine the time differential between them, that might be done by, for example, comparing the recordings taken through the same microphones during different performances and imputed the calculated lags to the entire take.

Additionally, the analysis will preferably also provide the foundation for the movement of data into the overview project section 205. There, similar audio content will be identified and the takes will preferably be arranged in parallel across the screen with the content aligned to make clear the similarities between the takes or recordings (e.g., the different takes will be overlapped on the screen to emphasize material that is similar in the overlapped region). So, for example, take 300 has been placed in track 1 of the overview project section 205. The analysis has determined that a portion of take 315 contains audio content similar to that in take 300 and the two takes have been positioned accordingly to reflect where the similar material might be found (i.e., in the overlapped region). Continuing with the present example, the analysis also determined that take 310 contains audio content similar to both take 300 and take 315 so the instant invention arranges the graphical representations of these takes so that similar audio content is aligned in time. Furthermore, the instant invention will preferably adapt the visual representation of the signal associated with each take to further assist in the identification and selection efforts of the sound engineer.

The functionality of timeline indicators 220 and 235 will preferably be the same as that described in connection with FIG. 2. These indicators are not the same, although they are interrelated. In FIG. 3 the user has selected take 305 in track 3 and has navigated within this take by moving the timeline indicator 220 to its present position. Actions and interactions of the user in the overview project will be relayed to the source project. Thus, the timeline indicator 235 in the source project section 210 is moved to the take selected in the overview project section 305 and then to the same time position. Not illustrated in FIG. 3 is the destination project section that is also preferably a part of the graphical user interface. The destination project section will preferably receive the selected audio content from the source project section 210 after editing instructions in the overview project section 205 have been performed.

Figure 4:
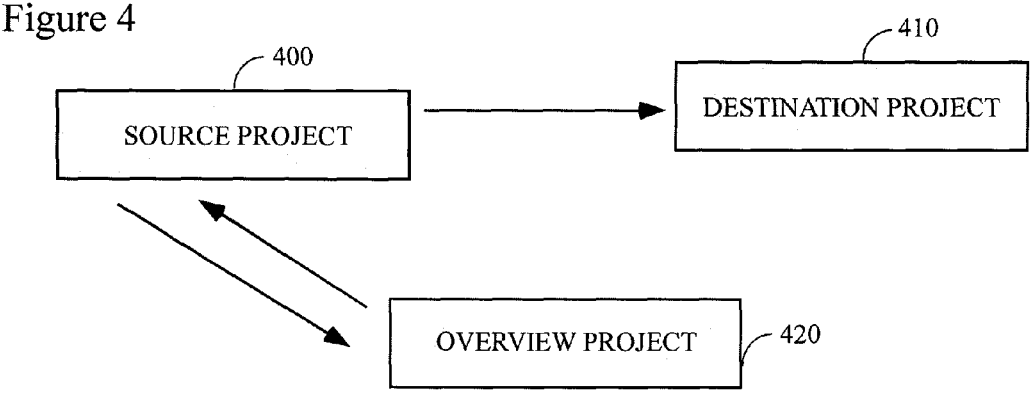
FIG. 4 contains a schematic illustration illustrating the dependencies of the individual project types of the instant invention.

FIG. 4 illustrates the preferred connection and dependencies between each project type utilized by the instant invention: the source project 400, the destination project 410 and the overview project 420.

The source project 400 is the preferred starting point for the instant invention. The sound engineer inputs the audio recording into the digital audio workstation and creates a source project 400. Using the input provided, the overview project 420 and destination project 410 will be generated. However, content or information concerning the content will preferably only be transferred from the source project 400 to the overview project 420, via an analysis step. The sound engineer will then preferably edit in the overview project 420, which edits will be transferred to the source project 400 where the edits will preferably be performed and the result will then be inserted into the destination project. For example, cutting 30 seconds of audio from track 4 will result in the transfer of the cut audio material from the source project 400 to the destination project 410.

Figure 5:
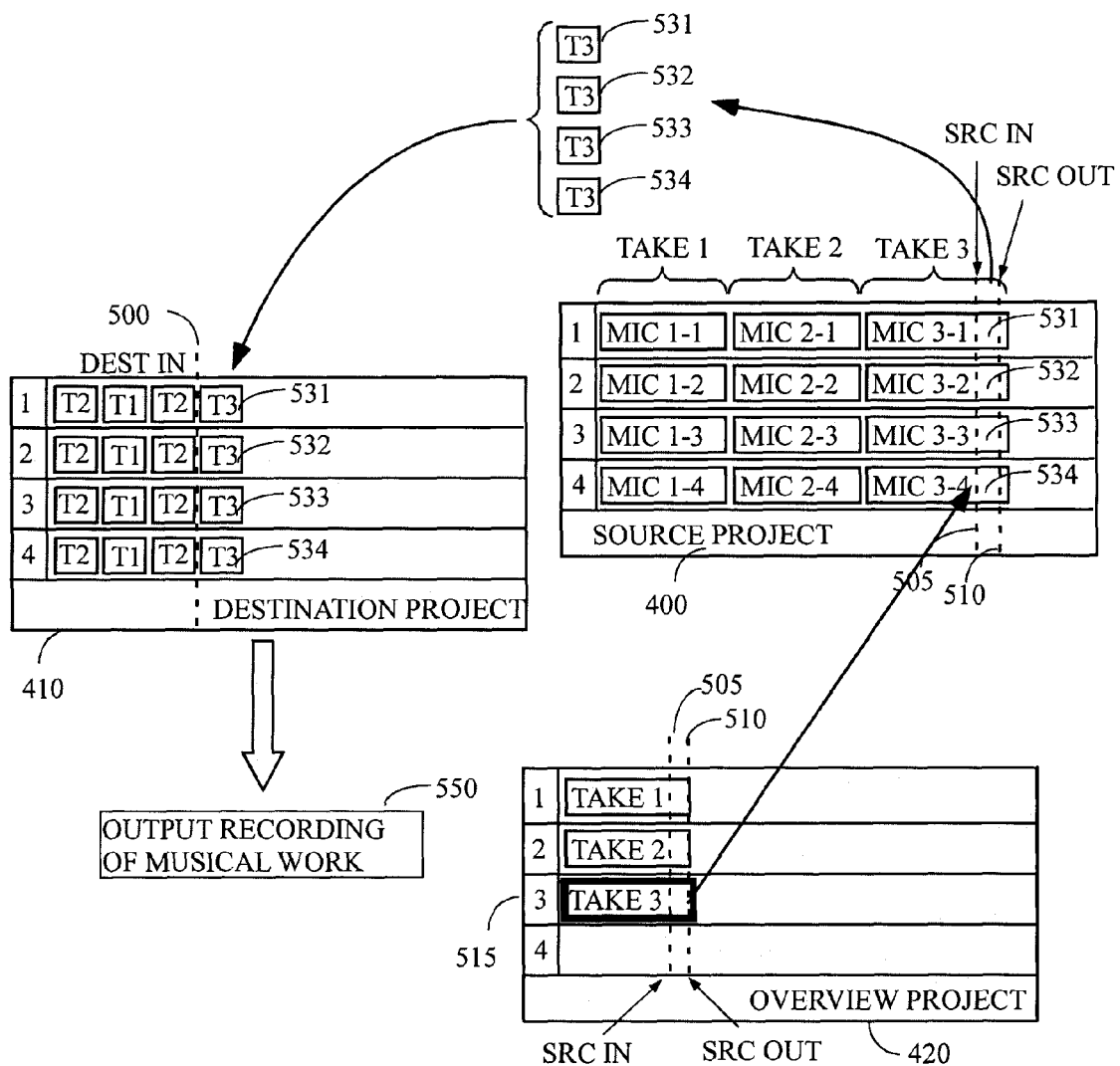
FIG. 5 depicts the processes and actions initiated between the individual project types of the instant invention.

Turning next to FIG. 5, this figure illustrates the interactions between the different project types of the instant invention. The different project types illustrated in this figure are the source project 400, the destination project 410 and the overview project 420. In this figure, the sound engineer has already copied audio content into the workstation and has edited it. This has generated the content in the destination project 410. The position in the destination project where the next content will be inserted is identified by a marker 500, the destination-IN marker. This marker 500 will preferably be changeable by the sound engineer. The instant invention will preferably automatically position the marker 500 at a point adjacent the last content insertion. Note that for purposes of clarity in the explanation that follows, in this example the recording sessions will be assumed to have been separated into separate takes as has been described previously.

By way of further explanation of the contents of this figure, the overview project 420 window contains icons that represent three different takes of the same subject performance, "TAKE 1", "TAKE 2", and "TAKE 3" in this example. As should be clear, there are three takes and four slots (numbered 1-4) available in the current overview project window 420. Obviously there could be many more slots and/or in this window.

As is made clearer in the source project 400 window, each take is comprised of (in this example) four different microphone recordings and the icon that represents each take is actually a placeholder for a number of different recordings. In the source project 400 window, TAKE 1 has four simultaneously captured recordings associated with it, MIC 1-1, MIC 1-2, MIC 1-3, and MIC 1-4, where the first index corresponds to the take (i.e., "1" for TAKE 1) and the second index corresponds to the particular microphone/recording acquired during that take. Similarly, TAKE 2 and TAKE 3 have MIC 2-1, MIC 2-2, MIC 2-3, and MIC 2-4, and MIC 3-1, MIC 3-2, MIC 3-3, and MIC 3-4, respectively, associated with them. As has been explained previously, each microphone might record a single instrument (e.g., a flute, a violin, a trumpet, etc.), a group of similar (or different) instruments (e.g., a horn section, a string section, etc.), the entire orchestra/band, etc.

In the source project 400 window, each take has been expanded to reveal its associated recording tracks. In this case, each take has four tracks/recordings but, obviously, that number could potentially be different for each of the takes. In the example of FIG. 5, each take contains recordings from different microphones and these different recordings are separated into individual tracks in the source project. This might be done for any number of reasons, but within the spirit of the present embodiment it should be clear that this makes it possible to quickly view and review the components of each take.

Note that the user has selected "SRC IN" (i.e., "source in") 505 and "SRC OUT" (i.e., "source out") 510 points in the recordings of Take 3 in the source project 400 and that this selection has been replicated to the takes in the overview project 420. Although the in 505 and out 510 indicators appear as though they extend across all three takes in the overview project 420 window, it is only TAKE 3 that has been selected (note the highlighting of that take) so the user can easily verify that only information from that take will be cut and extracted in the steps that follow. Further, note that the positions of the IN/OUT makers in the overview project 420 window correspond to the IN/OUT makers in the source project 400 window, i.e., the location in time (and the time difference between the IN 505 and out 510 markers) are synchronized in both windows.

In the overview project 420, the content will preferably be arranged track-wise with takes from the same microphones or other recording devices to being placed end-to-end. In this example, the user has selected an IN 505/OUT 510 time interval that includes elements from each of the four tracks within TAKE 3. The resulting audio segments or clips 531, 532, 533, and, 534 will be extracted and placed in the destination project 410 at insertion time 500, which might have been previously selected by the user or provided as a default (e.g., at the end of the audio data already present, following the audio data that was last inserted, etc.).

As is suggested by this figure, the output from the user specified IN/OUT and other edits will be stored in the destination project 410 at the time point 500 indicated. In that window, the blocks labeled "T1", "T2", etc. represent that the associated audio segments were obtained from TAKES 1, 2, etc. Although these audio blocks might appear to all be the same length in this figure that should not be interpreted to mean that the amount of audio material contributed in each block is the same. Indeed, there is no reason that every take has to be represented in the destination project 410 window or that the amount of audio material used from each take should be equal. Depending on the circumstances, the destination project 410 might be built from a single take (e.g., if the selected take is uniformly the best) or any combination of the takes that are available to the user.

Note that according to the preferred method, the clips that are placed in a given track of the destination project 410 (e.g., "T2", "T1", "T2", and "T3" in FIG. 5) will preferably be non-overlapping (or at least preferably not substantially overlapping) in order for the composite work that is created from them to produce an intelligible recording. That is, unless the collection of cuts in the destination project at least approximately covers the entire musical work the resulting digital work will have noticeable gaps that listeners will find disconcerting. As such, the instant invention is designed to assist the user in this goal by time aligning multiple takes of the same section of music as has been discussed previously in connection with FIG. 3.

Finally, after the musical work that is the subject of the performances (and associated takes) has been assembled in the destination project, the resulting recording 550 will created by writing an audio file to output. Although the output file might be formed from the audio content in the destination project 410 in many ways, it is anticipated that usually the multiple tracks will likely be mixed down into one (mono) or two (stereo) tracks according to methods well known to those of ordinary skill in the art. Of course, in some instances the resulting recording might be intended for theater (home or commercial) use, in which case a five, six, or seven channel surround sound (with or without a separate subwoofer signal) recording might be generated. Thus, there could be an arbitrary number of output channels in the final recording 550.

Figure 6:
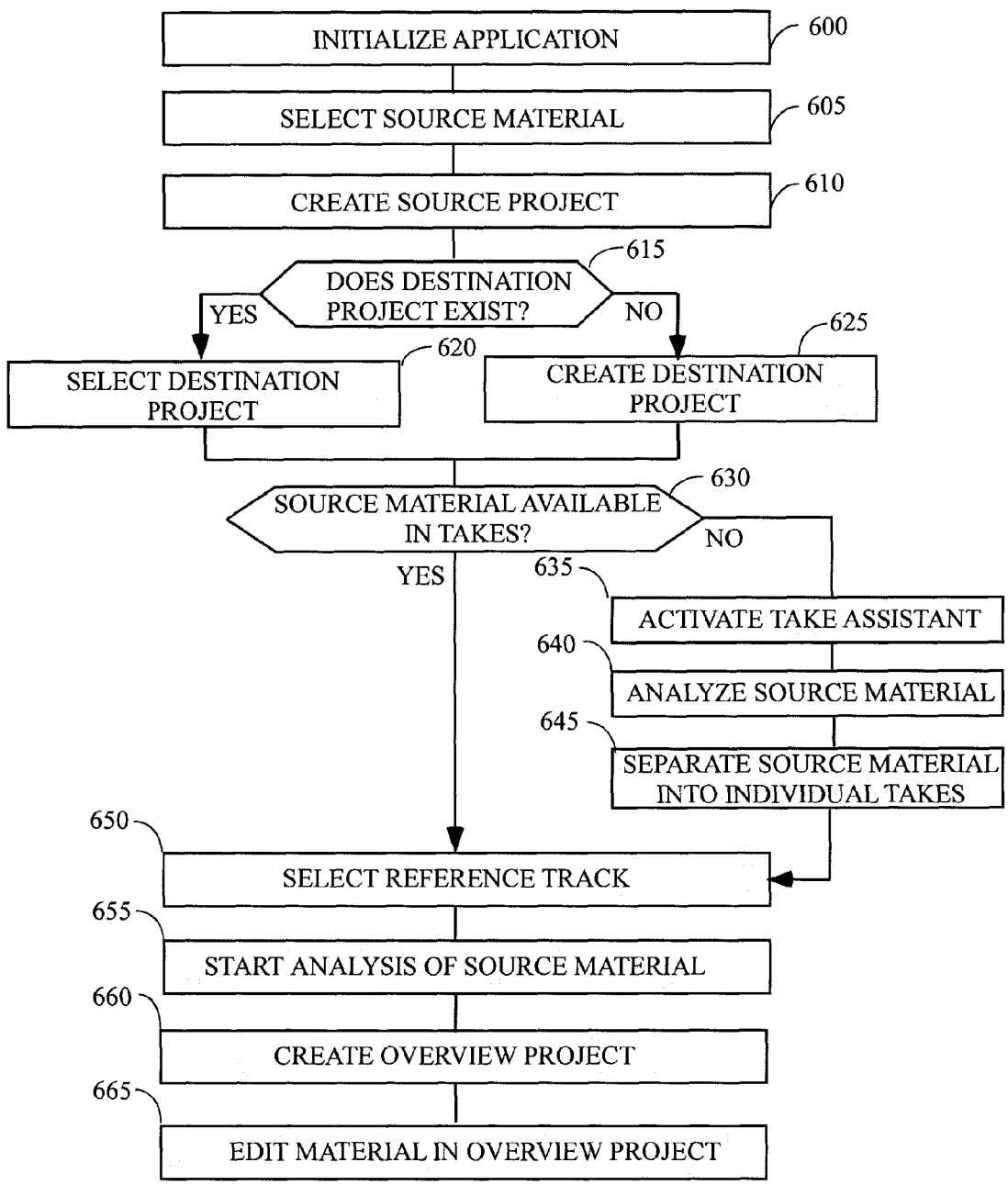
FIG. 6 illustrates the general workflow when initiating and using the instant invention.

Turning next to FIG. 6, this figure illustrates a preferred general workflow of the instant invention. As a first preferred step 600, the program will be started and initialized according to methods well known to those of ordinary skill in the art. Next the user will preferably select the source material 605, the source material being a recording containing multiple recordings of a single event or a continuous recording containing multiple repeated takes of the same audio material.

In the next preferred step, the instant invention will generate the source project 610. The source material will preferably automatically be inserted into the source project window and displayed for the sound engineer, with individual instruments preferably being allocated to different tracks assuming, of course, that the recordings support such an allocation. As a next preferred step it will be determined 615 if a destination project has already been created by the editor. If not, the instant invention will create a destination project 625. If a destination project has already been created, the instant invention will preferably select the destination project 620.

In a next preferred step the instant invention will determine if the source material is already available in takes 630, that is, whether the sections of audio that correspond to different takes have already been identified. If the material has not been separated into individual takes, the instant invention will activate a take assistant 635. This take assistant 635 will analyze the source material 640, detect audio breaks or moments of silence and separate the source material into individual takes 645.

In the next preferred step—which is also the next step if the audio material is already separated into takes, the instant invention will require the user to select a reference track 650. The reference track will preferably be a track that contains a complete recording of a performance because, as will be discussed below, the other tracks will be compared with the reference track in order to determine their time-placement. Thus, if the reference track contains less than the recording of an entire performance, additional takes may need to be selected in order that the entirety of the performance is covered. Further, the reference track might be a recording taken from a single microphone or a combined (e.g., summed or mixed) recording that has been created from several different tracks or microphones. As a consequence, it should be noted that when the term track is used herein, that usage should be understood to include original single-microphone recordings as well as post-recording combinations of two or more different microphones.

As a next preferred step the instant invention will analyze the source material 655, with the analysis being the starting point for the generation of the overview project. In the analysis phase, the source material will be processed via a pattern detection algorithm that utilizes data from the reference track to detect similar audio patterns from the source material. This detected and selected audio content will then be inserted into the overview project 660, with individual takes placed in tracks beneath each other. Similar audio material will preferably be arranged on the screen such that similar patterns in the takes are time aligned with each other. For example, a take from the source material that contains over 40 individual instruments, which are visually presented as 40 individual tracks in the source project, will preferably be presented as a single take in the overview project. Additionally, the instant invention will preferably adapt the display of the sonic waveform of the takes so that the sound engineer can visually determine similar sonic content. In the next preferred step, the sound engineer will edit the data in the overview project 665.

Figure 7:
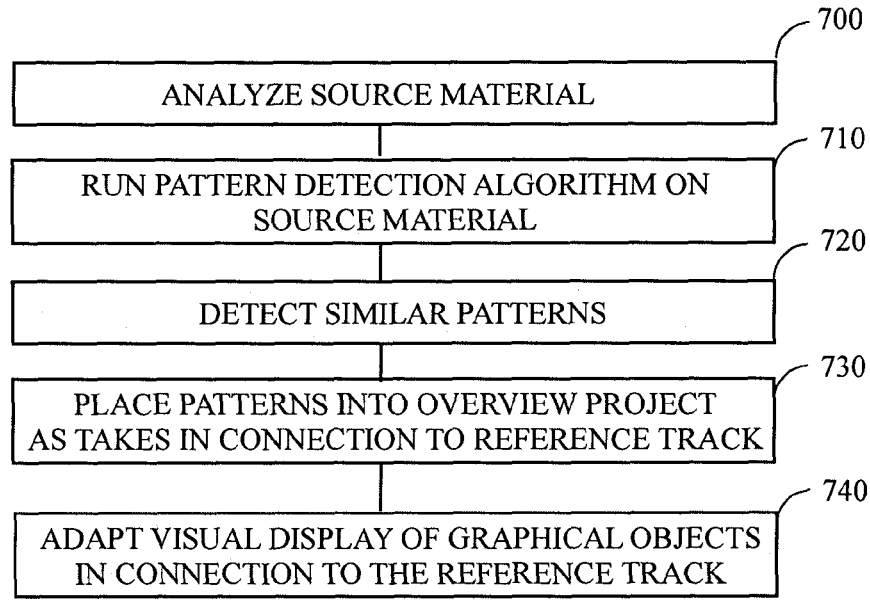
FIG. 7 depicts a preferred operating logic during the creation and population of the overview project.

Turning next to FIG. 7, this figure illustrates a preferred operating logic suitable for use during the creation and population of the overview project. In a first preferred step the analysis of the source material will be initiated 700. Preferably, a pattern detection algorithm 710 will be used to identify passages in the audio material 720. In the detection phase, the audio material will preferably be scanned sequentially and similarities will be detected. In one embodiment, a minimum duration threshold will be imposed to make sure that only sections are identified as similar if that similarity occurs for a specified period of time. The detected patterns will then automatically be placed into the overview project as takes, with position of the reference track being kept in the display. That is, all of the detected patterns will preferably be aligned with the reference track 730.

In the next preferred step, the instant invention will take into account possible timing differences that were introduced when the audio material was recorded and will modify the visual display of the waveforms that represent the individual to match that of the reference track. The data is not is not changed, only the screen display.

Figure 8:
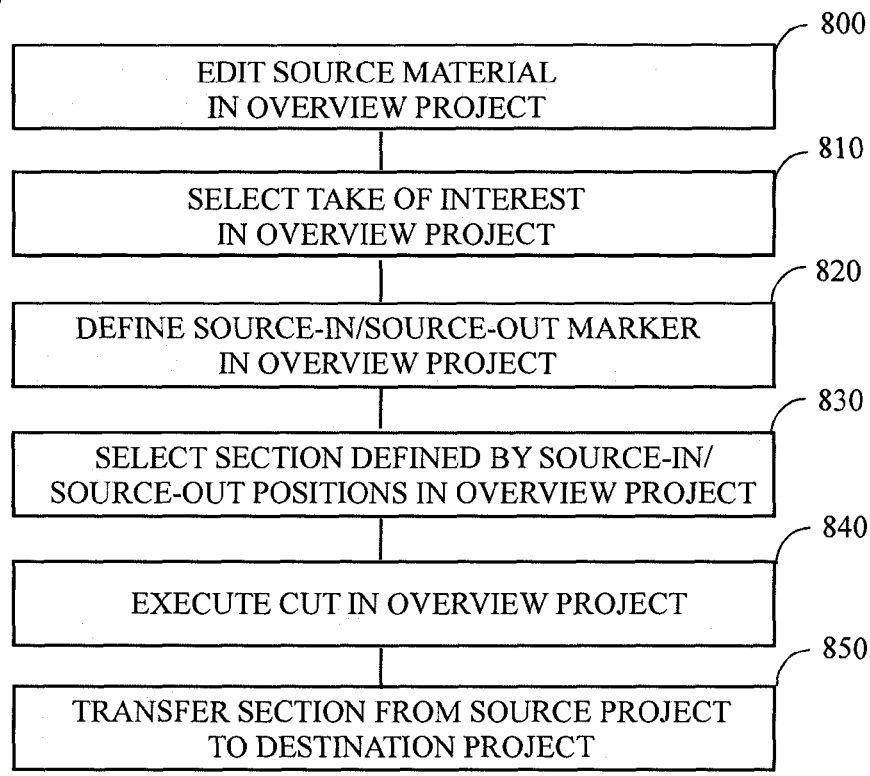
FIG. 8 illustrates the processes associated with editing the source material according to the instant invention.

Turning next to FIG. 8, this figure depicts the preferred processes associated with editing source material according to the instant invention. In a first preferred step the user edits the source material in the overview project 800. This step is preferably begun after the instant invention has analyzed the source material and populated the overview project. In the next preferred step the sound engineer will select a take in the overview project 810. The selected take will be the one that represents the best audio quality of the recorded material. In the next step the sound engineer will define the source-IN and source-OUT markers in the overview project 820. The markers delimit the passage of the currently selected take that the sound engineer wants to use in the final output audio work. The sound engineer will not be limited in his or her placement of the markers. It will be possible to select any portion or all of the current take. However, preferably the sound engineer will select a subset of the currently selected take.

In the next preferred step, the instant invention will automatically and internally (i.e., only the end result of this step will be provided to the user) select the section defined by the source-IN and source-OUT markers 830. This section will preferably be extracted later but the markers will remain visible to make it possible for the user to issue further instructions with respect to this section. In the next step, if the sound engineer is satisfied with his or her selection, he or she will preferably initiate the cut 840. The cut will then preferably automatically select the defined section from the audio source material and transfer that section from the source project to the destination project 850. The timing position and exact type of audio source material that is desired to be moved to the destination project will be communicated to the instant invention embedded in the cut action instruction initiated by the editor.

CONCLUSIONS

Of course, many modifications and extension could be made to the instant invention by those of ordinary skill in the art. For example, in one preferred embodiment the editing instructions of the user will not be implemented immediately. Instead, these instructions will be accumulated and implemented later when the sound engineer ends his or her editing work. Additionally, in another preferred embodiment it would be possible to provide the sound engineer with the option of evaluating his or her selection decisions by allowing the sound engineer to listen to similar audio takes from the source material after the destination project has been created and filled with audio source material. In that preferred embodiment, the instant invention will provide selectable visual overlays representing the audio material, with the sound engineer being able to listen to the content after activating a playback control. With such a preferred embodiment, the sound engineer will be able to re-visit or add new audio source material to an already completed destination project without re-doing the editing. This might be useful where, for example, a part of the recording was not available in good quality and that part had to be re-recorded.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of creating a digital recording of a musical work from a plurality of takes of different performances of the musical work, wherein each of said plurality of takes is comprised of three or more recordings of a same one of said performances, comprising the steps of:
    (a) accessing said plurality of takes;
    (b) displaying on a display device a representation of each of said plurality of takes;
    (c) displaying on said display device representations of each of said three or more recordings comprising each of said takes;
    (d) obtaining a reference recording from among said three or more recordings comprising each of said takes;
    (e) selecting at least one recording from each of said takes not containing said reference recording, thereby selecting a plurality of non-reference recordings;
    (f) calculating a similarity between said reference recording and said plurality of non-reference recordings;
    (g) using at least said calculated similarities between said reference recording and said plurality of non-reference recordings to time-align each of said plurality of takes with respect to each other on the display device;
    (h) choosing three or more clips from among said displayed plurality of time-aligned takes;
    (i) organizing said chosen three or more clips in time order, thereby creating three or more different recordings of said musical work from said chosen plurality of clips;
    (j) combining said three or more different recordings to produce a digital recording of the musical work; and,
    (k) performing said digital recording of said musical work for at least one listener.

2. A method of creating a digital recording of a musical work from a plurality of takes of different performances of the musical work according to claim 1, wherein at least one of said plurality of takes has been extracted from a longer audio work using a take assistant.

3. A method of creating a digital recording of a musical work from a plurality of takes of different performances of the musical work according to claim 2, wherein said take assistant performs at least the steps of:
    (1) accessing said longer audio work,
    (2) determining at least one location in said longer audio work wherein a volume level in said longer audio work is a minimum, and,
    (3) using at least said at least one location to extract at least one of said plurality of takes.

4. A method of creating a digital recording of a musical work from a plurality of takes of different performances of the musical work according to claim 1, wherein step (b) comprises the step of:
    (b1) displaying on a display device within an overview project window a representation of each of said plurality of takes;
    and wherein step (c) comprises the steps of:
    (c1) displaying on said display device within a source project window representations of each of said three or more recordings comprising each of said takes, and,
    (c2) displaying on said display device a destination project window, said destination project window at least for receiving a representation of said digital recording of said musical work.

5. A method of creating a digital recording of a musical work from a plurality of takes of different performances of the musical work according to claim 4,
    wherein a first timeline indicator position within said overview project window is automatically matched by a second timeline indicator position within said source window, and, wherein an edit operation performed within said overview project window is automatically matched within said source project window.

6. A method of creating a digital recording of a musical work from a plurality of takes of different performances of the musical work according to claim 5,
wherein a cut operation performed within said overview project window is automatically matched within said source project window, and
wherein an audio segment resulting from said cut is automatically copied from said source project window to said destination project window.

7. A method of creating a digital recording of a musical work from a plurality of takes of different performances of the musical work according to claim 1, wherein step (d) comprises the step of:
(d1) selecting a reference recording from among said plurality of three or more recordings comprising each of said takes.

8. A method of creating an audio recording of a musical work according to claim 1, wherein said digital recording of the musical work is a stereo recording of the musical work.

9. A method of creating an audio recording of a musical work, comprising the steps of:
(a) accessing a plurality of audio takes,
each of said audio takes recording at least a portion of a different performance of said musical work,
each of said audio takes comprising three or more recordings of a same performance, and,
each of said audio takes being comprised of three or more audio tracks;
(b) selecting a reference take from among said plurality of audio takes, each of said plurality of audio takes that is not selected being identified as a non-reference take;
(c) obtaining a reference track from among said three or more audio tracks associated with said reference take;
(d) calculating a similarity between said reference track and at least one track belonging to each of said non-reference takes, thereby obtaining a plurality of similarity values;
(e) using at least said plurality of similarity values to time-align at least a portion of said plurality of non-reference audio takes with respect to said reference track, thereby creating a plurality of time-aligned takes;
(f) displaying on a display device a visual representation of said reference take and said plurality of time-aligned takes, each of said plurality of time-aligned takes being at least approximately positioned on said display device at a location that is time-aligned with respect to said visual representation of said reference take;
(g) selecting a plurality of non-overlapping clips from among said visual representations of said reference take and said plurality of time-aligned takes;
(h) assembling said plurality of non-overlapping clips to create three or more different recordings said musical work;
(i) using said three or more different recordings to create said audio recording of said musical work; and,
(j) performing at least a portion of said musical work for at least one listener.

10. A method of creating an audio recording of a musical work according to claim 9, wherein step (d) comprises the step of:
(d) calculating a cross correlation between said reference track and at least one track belonging to each non-reference takes, thereby obtaining a plurality of similarity values.

11. A method of creating an audio recording of a musical work, comprising the steps of:
(a) accessing a plurality of audio takes, wherein
each of said audio takes records at least a portion of a different performance of the musical work,
each of said audio takes comprises three or more simultaneous recordings of a same performance,
each of said audio takes comprises three or more audio tracks, and, each of said audio tracks comprising said audio take recording a different instrument;
(b) selecting a reference take from among said plurality of audio takes, each of said plurality of audio takes that is not selected being identified as a non-reference take;
(c) obtaining a reference track from among said three or more audio tracks comprising said reference take, said reference trace;
(d) using said reference track to determine a relative time shift between said reference track and each of said non-reference takes;
(e) using said determined relative time shifts between said reference track and each of said non-reference takes to time-align at least a portion of said plurality of non-reference audio takes with respect to said reference track, thereby creating a plurality of time-aligned takes;
displaying on a display device a visual representation of said reference take and said plurality of time-aligned takes, each of said plurality of time-aligned takes being at least approximately positioned on said display device at a location that is time-aligned with respect to said visual representation of said reference take;
(g) selecting three or more substantially non-overlapping clips from among said visual representations of said reference take and said plurality of time-aligned takes;
(h) assembling said three or more substantially non-overlapping clips to create three or more different recordings said musical work;
(i) using said three or more different recordings to create said audio recording of said musical work; and,
(j) performing at least a portion of said musical work for at least one listener.

* * * * *

UNITED STATES PATENT AND TRADEMARK OFFICE
CERTIFICATE OF CORRECTION

| | |
|---|---|
| PATENT NO. | : 8,464,154 B2 |
| APPLICATION NO. | : 12/713006 |
| DATED | : June 11, 2013 |
| INVENTOR(S) | : Herberger et al. |

Page 1 of 1

It is certified that error appears in the above-identified patent and that said Letters Patent is hereby corrected as shown below:

On the title page item (75), the list of inventors is corrected to add inventor TONI ENGEL, GERMANY Signed and Sealed this
Thirteenth Day of August, 2013

Teresa Stanek Rea
*Acting Director of the United States Patent and Trademark Office*